No. 731,727. PATENTED JUNE 23, 1903.
W. W. WORD.
PROCESS OF FORGING ROCK DRILLS.
APPLICATION FILED APR. 25, 1903.
NO MODEL. 2 SHEETS—SHEET 1.

Witnesses:
M. J. Dixon
W. R. Berry

Inventor:
William W. Word,
by J. Richards & Co.,
attys.

No. 731,727. PATENTED JUNE 23, 1903.
W. W. WORD.
PROCESS OF FORGING ROCK DRILLS.
APPLICATION FILED APR. 25, 1903.
NO MODEL. 2 SHEETS—SHEET 2.

Witnesses:
M. J. Dixon
W. R. Berry

Inventor:
William W. Word,
by J. Richards & Co.,
Attys

No. 731,727. Patented June 23, 1903.

UNITED STATES PATENT OFFICE.

WILLIAM W. WORD, OF SOULSBYVILLE, CALIFORNIA.

PROCESS OF FORGING ROCK-DRILLS.

SPECIFICATION forming part of Letters Patent No. 731,727, dated June 23, 1903.

Application filed April 25, 1903. Serial No. 154,320. (No model.)

*To all whom it may concern:*

Be it known that I, WILLIAM W. WORD, a citizen of the United States, residing at Soulsbyville, county of Tuolumne, and State of California, have invented certain new and useful Improvements in Processes of Forging Rock-Drills; and I hereby declare the following to be a full, clear, and exact description of the same, reference being had to the accompanying drawings, forming a part of this specification.

My invention relates to a new and improved method or mechanical process for forging and shaping the cruciform terminals of rock-drills, whereby a rapid, accurate, and uniform result is obtained, with a better disposition of metal to secure strength and durability in the article than by ordinary methods, and the skill and expense required by hand-work is done away with. The method can also be employed in sharpening the same kind of drill.

To enable others skilled in the art to which my said invention relates to execute and use the same, I append the following description, making reference to the accompanying drawings, forming a part of this specification, to illustrate the several steps of operation, in which—

Figure 2:
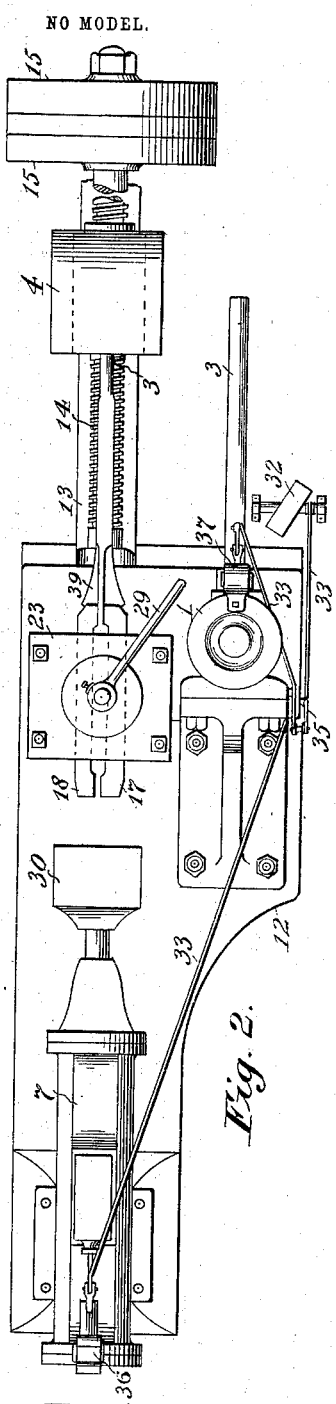
Figure 1:
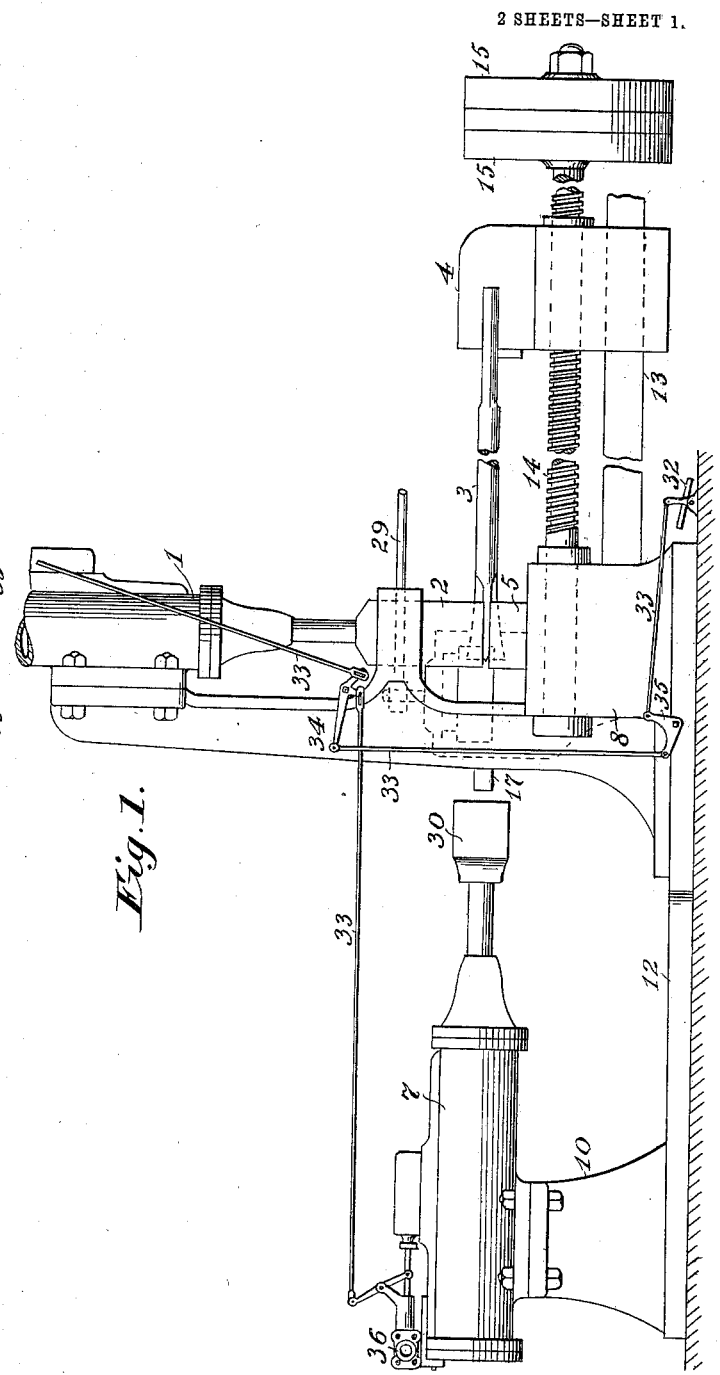
Figure 9:
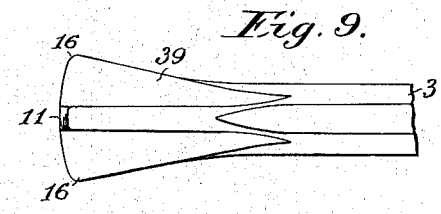
Figure 10:
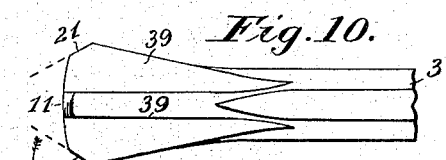
Figure 11:
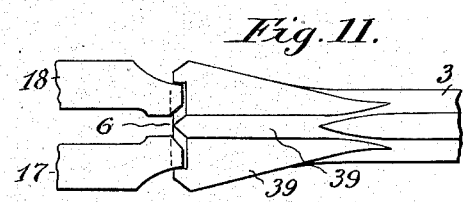
Figure 12:
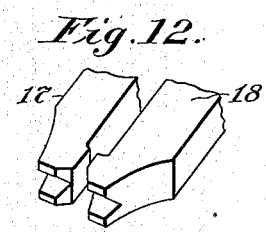
Figures 3, 4, 8:
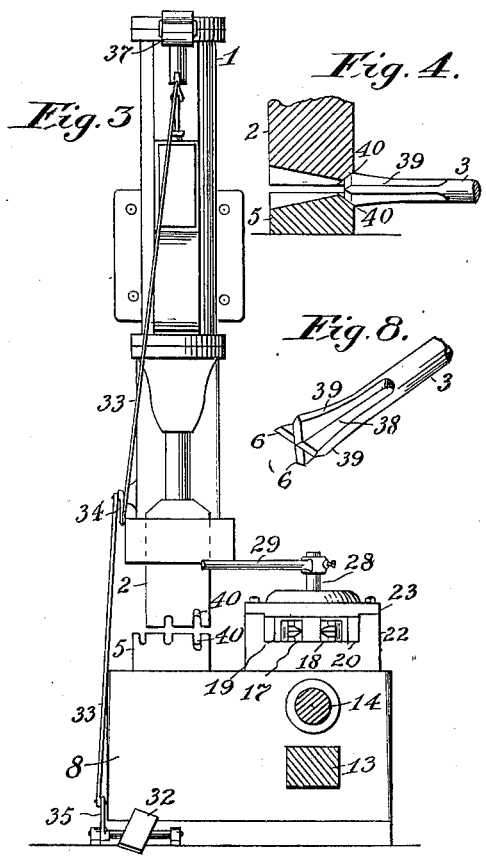
Figure 5:
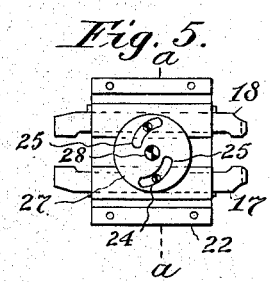
Figures 6, 7:
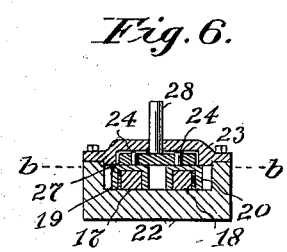

Figure 1 is a side elevation of an apparatus suitable for the purpose. Fig. 2 is a plan view of the same. Fig. 3 is a front elevation. Fig. 4 is a vertical section of the swaging-dies. Fig. 5 is a plan view of the laterally-movable dollies for shaping the edges of the article and means for moving the same. Fig. 6 is a transverse section through Fig. 5 on line $a\,a$. Fig. 7 is a horizontal section through Fig. 6 on line $b\,b$. Fig. 8 is a perspective view of a finished drill. Figs. 9, 10, and 11 are views of the cutting end of the drill in different stages of its formation. Fig. 12 is a view in perspective of the operating ends of the dollies that form the cutting edges.

In said drawings, 1 is a vertical power-hammer provided with a massive reciprocating die 2, acting against a counterpart die 5, each provided with an indented matrix corresponding in form to that of the flaring cruciform drill end to be shaped and also having the anterior sloping cavities 40, the use of which is hereinafter explained.

3 is the drill, (shown in completed form in Fig. 8,) having the angular depressions 38 and wings 39, with terminal cutting edges 6, which characterize the cruciform rock-drill in common use. The cutting end of said drill rests upon the lower matrix and die, as shown in Fig. 1, said lower die being supported upon a massive anvil 8.

12 is a sole-plate on which the various parts of the apparatus are sustained.

7 is a horizontally-placed power-hammer supported by pedestal 10 on sole-plate 12 out of alinement with hammer 1 and is provided with a massive head 30 broad enough to impinge on both of the expansible dollies 17 18 when at their outer limit of expansion, as hereinafter described.

4 is a movable and adjustable anvil-block opposite to and in alinement with the power-hammer head 30. It acts as a buttress for the outer end of the drill and is made massive to resist by its inertia the concussion caused by the blows of said hammer-head when shaping the drill ends, as hereinafter described. Said anvil-block 4 is movable back and forth to suit the length of the drills on suitable guiding and supporting means (represented by guiding-bar 13) and is operated by means of a screw 14, revolubly supported at its inner end, threaded into anvil-block 4, and rotated in either direction by any suitable mechanical means, those shown being belt-pulleys 15, whose mode of operation is too well known to need further description. This means of moving and adjusting the anvil-block in position to suit circumstances also locks it in position, which is essential to function. Intermediate between the power-hammer 7 and said anvil-block 4 and in alinement are located the shapers for drawing and finishing the wing edges, which are the expansible dollies 17 18, before referred to. These dollies are held, respectively, in open-bottomed guides 19 20, sliding laterally in a recess formed in a block 22, suitably supported and protected by a cover-plate 23, secured upon said block 22. On top of said sliding guides 19 20 are upright pins 24, engaging by means of curved cam-slots 25 with a rotatory disk 27, resting upon said guides beneath the cover-plate in a recess therein and operated by means of a stem 28, secured to said disk, passing upward through the cover-plate and provided with a lever-handle 29, by which the said disk is turned to the right or left to move the guides 19 20, with the contained dollies, nearer together or farther apart for purposes hereinafter described. The operative ends of the dollies toward the drill are recessed, as shown in Figs. 5, 7, and 12, with V-shaped depressions corresponding to the form of the edges of the drill, and are made narrow, as shown, for purposes hereinafter explained. The opposite ends of the dollies are acted upon simultaneously by the successive blows of the hammer-head 30 to shape the die edges, and also the dollies, being expanded at the same time by means of the lever 29, operate to spread the metal of the die edges laterally and gradually away from the center, as hereinafter explained, and do not stove it, as would be the case were the dolly ends wide enough to act upon the whole die edge at once in one place and without expansion.

The power-hammers 1 and 7 may be operated by any elastic fluid, preferably compressed air, or even by hydraulic power or electric means or by mechanical gearing, as such means is not the essence of the present invention. When operated by elastic fluid, such as steam or air, the usual valves are employed, (illustrated at 36 and 37,) connected by mechanical communications 33 34 35 with a foot-pedal 32, the movement of which in opposite directions starts or stops the hammers 1 and 7 alternately one at a time, as governed by the range of movement of the pedal. Equivalent well-known means are employed when any other medium or source of power is selected.

The means for moving the adjustable anvil-block 4 and locking the same in a fixed position is not confined to a screw, as shown, that being introduced only as a convenient and simple illustration. Any other known mechanical means for effecting the same result of adjustment and locking is germane to the present invention, which is not concerned with the mechanical appliances *per se*, but only with the mechanical process effected by the aid of such or similar appliances, which will now be described.

The apparatus proper which I preferably employ in carrying out the said process is claimed in my application filed September 24, 1902, Serial No. 124,705, copending herewith.

Operation: The bar or blank 3 is placed in horizontal position with the end to be shaped inserted between the dies 2 and 5. The proper configuration is then imparted to it by setting the hammer 1 into operation, which after repeated blows and proper manipulation reduces the terminal approximately to the desired cruciform shape. The metal is thus displaced from the grooves 38, Fig. 8, and driven by redundancy into the recesses of the die which form the wings 39. This redundancy produces the curved contour (seen at 11) in the center with the shortened corners 16. (Shown in Fig. 9.) It is the object of this method to recover this redundant metal without permanent strain and produce full and perfect corners, on which the perfection and durability of the tool in great part depends. The blank at this stage is now inserted at its end in the short beveled cavities 40 of the dies 2 and 5, and a few blows are imparted, condensing the corners and producing the form shown at 21 in Fig. 10, which is not the final shape desired. The drill is now shifted from the action of power-hammer 1 to that of power-hammer 7 in front of the dollies 17 18, which are at their narrowest position. The movable anvil-block 4 is brought up to abut against the outer end of drill 3 and fixed in that adjusted position. Power-hammer 7 is brought into operation against the adjacent ends of dollies 17 18, which by repeated blows gradually drives the redundant metal from the center outward, the dollies being at the same time progressively expanded by means of lever 29, so as to operate on successive portions of the redundant metal and gradually turn out the beveled portions 21 to become a part of the deficient side of the wings, and thus supply at the extreme corners of the drill sufficient metal to complete the outer line of the wings 39 and give the perfected and straight final form to the cutting edges 6, as shown in Fig. 8, without any weakness or flaws at the extreme corners, where the severest test of the tool occurs in practical use.

I claim and desire to secure by Letters Patent—

1. The process of forging and shaping rock-drills herein described, which consists in first swaging the end of a drill-blank to bring it approximately to a flaring cruciform shape having wings at right angles and angular depressions between, then swaging the terminal portion to condense and shorten the wing-corners, and finally forming the cutting edges of the wings by means of endwise blows delivered thereon through suitable appliances from the center successively outward, which reduce and draw the redundant metal from the center outward, fill out the corners, and form finished V-shaped solid edges all lying in the same plane.

2. The herein-described process of forging and shaping rock-drills, which consists in first swaging a blank to an approximately cruciform flaring shape having wings at right angles and angular depressions between, then condensing and shortening the wing-corners, and finally finishing the edges by suitable mechanical action thereon which draws the redundant metal from the center outward, fills out the shortened corners, and gives the final V shape to the cutting edges.

In testimony whereof I have signed my name to this specification in the presence of two subscribing witnesses.

WILLIAM W. WORD.

Witnesses:
W. H. BARRON,
A. G. WORD.